(12) United States Patent
Kalisz et al.

(10) Patent No.: US 7,631,890 B1
(45) Date of Patent: Dec. 15, 2009

(54) INVISIBLE MOLDED-IN TEAR SEAM AND HINGE FOR AN AIRBAG DEPLOYMENT DOOR

(75) Inventors: Raymond E. Kalisz, Livonia, MI (US); Kenneth J. Kwasnik, Shelby Township, MI (US); Nicholas A. Mazzocchi, Canton, MI (US)

(73) Assignee: Automotive Components Holdings, LLC, Dearborn, MI (US)

( * ) Notice: Subject to any disclaimer, the term of this patent is extended or adjusted under 35 U.S.C. 154(b) by 0 days.

(21) Appl. No.: 12/190,266

(22) Filed: Aug. 12, 2008

(51) Int. Cl.
  *B60R 21/20* (2006.01)
(52) U.S. Cl. .................................................. 280/728.3
(58) Field of Classification Search .............. 280/728.3, 280/731, 732; 180/90
  See application file for complete search history.

(56) References Cited

U.S. PATENT DOCUMENTS

| | | | |
|---|---|---|---|
| 5,997,030 A * | 12/1999 | Hannert et al. | 280/728.3 |
| 6,453,535 B1 | 9/2002 | Nicholas | |
| 6,808,197 B2 | 10/2004 | Bauer et al. | |
| 6,976,701 B2 | 12/2005 | Gray et al. | |
| 7,014,208 B2 | 3/2006 | DePue et al. | |
| 7,093,850 B2 * | 8/2006 | Merrifield et al. | 280/728.3 |
| 7,100,941 B2 | 9/2006 | Riha et al. | |
| 7,156,415 B2 * | 1/2007 | Gray et al. | 280/728.3 |
| 7,380,814 B2 | 6/2008 | Preisler | |
| 7,458,604 B2 * | 12/2008 | Hier et al. | 280/728.3 |
| 2003/0107203 A1 * | 6/2003 | Bauer et al. | 280/728.3 |
| 2006/0082109 A1 * | 4/2006 | Hier et al. | 280/732 |

* cited by examiner

*Primary Examiner*—Faye M. Fleming

(57) ABSTRACT

A cover panel for the air bag in an automotive vehicle with an invisible deployment door section defined by pre-weakened hinge and tear seam formed on the underside of the instrument panel base substrate during the base substrate molding process. The hinge and tear seams are formed into the underside of the base substrate by projections extending from a lower surface mold preform and are differently proportioned in size to provide sequentially operating functions during air bag deployment. Flowing the liquid substrate material into opposing sides of the mold allow for more even cooling and smooth upper surface over the reduced thicknesses of the invisible door hinge and seams.

16 Claims, 3 Drawing Sheets

INVISIBLE MOLDED-IN TEAR SEAM AND HINGE FOR AN AIRBAG DEPLOYMENT DOOR

BACKGROUND

1. Field of the Invention

This invention relates to the field of air bag deployment covers for an automotive vehicle and more particularly to the area of a door panel structure that has a pre-weakened hinge and tearable seams formed for air bag deployment.

2. Description of the Prior Art

Most recently in this technology field, there is a desire to make the air bag deployment door in instrument panels and other locations invisible to occupants of the vehicle and achieve a desired aesthetic for vehicle interiors. Several patents show various techniques and materials used to form cover panels with invisible air bag deployment doors.

U.S. Pat. No. 6,453,535 discloses a process that employs a laser to provide a concealed deployment door and opening in a substrate panel. In that patent, the pre-weakened scoring traces out the door except for bridging tabs which remain to provide support for the door member.

U.S. Pat. No. 6,808,197 discloses a process that employs a multi-axis laser manipulator for providing continuous controlled scoring of the inside of an instrument panel to form a pre-weakened pattern.

U.S. Pat. No. 7,100,941 discloses various techniques of pre-weakening an outer woven material, including weakening the fabric from either the front or backsides by thinning, cutting or melting and by weaving in weaker yarns to define the pre-weakened pattern.

Each of the prior art attempts to provide a pre-weakened area that defines the door for air bag deployment requires post-processing steps that follow the manufacturing process for the instrument panel.

SUMMARY OF THE INVENTION

The present invention is directed to an improved apparatus and method for providing invisible hinge and seams to define the air bag opening cover such as is located on the passenger side instrument panel of an automotive vehicle. The invention is also suited for a driver side steering wheel mounted air bag system or any other location where a pre-weakened and externally invisible tear seam is required.

With the variety of materials increasing for automotive interiors, it has been found that conventional scoring and pre-weakening techniques are not always effective to ensure that a deployment door can be formed which is invisible to the vehicle occupant, has the strength properties to resist inward pressures and opens properly during air bag deployment. The present invention is preferably implemented by molding in the hinge and tear seams at the same time the substrate for the instrument panel is being formed by a molding process.

It is an object of the present invention to provide an instrument panel for an automotive vehicle with a defined air bag deployment door including a relatively rigid base substrate structure having an outer surface and an inner surface and a relatively constant thickness between the surfaces surrounding the defined deployment door. An outer finish skin material is adhered to and overlies the outer surface. The base structure is molded to define the inner and outer surfaces and a deployment door section. The deployment door section is defined in the molded structure by reduced thicknesses in tear seams and hinge portions formed into the inner surface and maintaining the defined deployment door invisible from the outer surface.

It is another object of the present invention to provide a method of forming an invisible door in an instrument panel of an automotive vehicle that allows the deployment of an air bag and comprises the following steps:

providing a mold for an instrument panel substrate having a plurality of mold preforms placed in a spaced apart configuration for forming the substrate with upper and lower surfaces in an area that will define the deployment door of a first predetermined thickness; providing a mold preform for forming the lower substrate surface in the area that will define the deployment door; providing an opposing mold preform for forming the upper substrate surface in the area that will define the deployment door; providing the lower surface mold preform with a plurality of protrusions entering the space between the mold preforms to define at least one hinge seam and a plurality of tear seam indentations in the lower surface; providing said opposing perform to form a non-indented and smooth substrate surface at least in those areas facing where protrusions enter the space between the performs; providing the protrusion for the at least one hinge seam at a predetermined first height extending into the space between the mold preforms; providing the protrusions for the tear seams at predetermined heights that are greater than the first height; providing a protrusion for one of the tear seams opposing the at least one hinge seam at a second predetermined height that is greater than all other heights; flowing a liquid phase of the substrate material between the mold preforms; and allowing substrate material between the mold preforms to set to a self-supporting solid before removing the instrument panel from the mold preforms.

DETAILED DESCRIPTION

Figure 1:
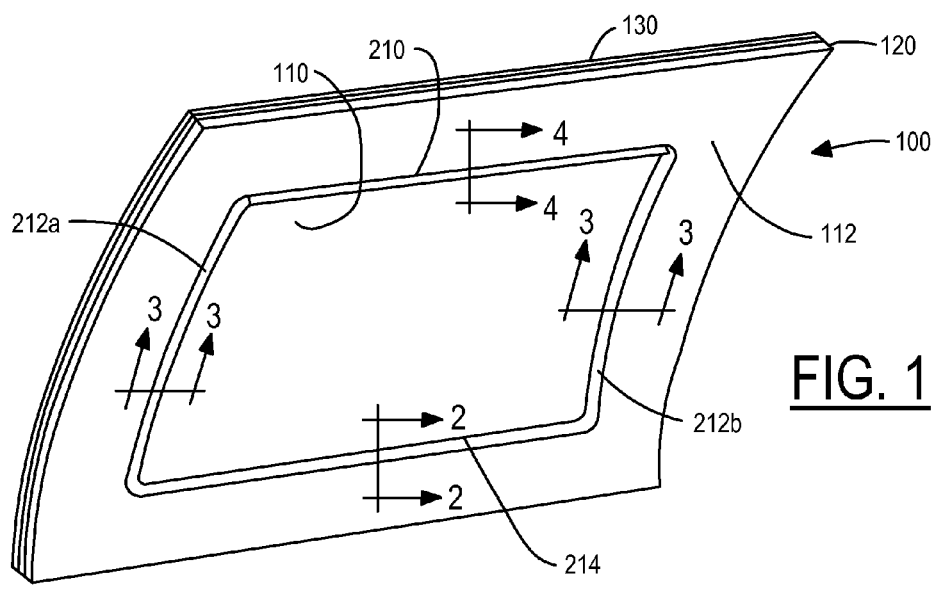
FIG. 1 is a perspective view of a portion of an interior cover panel having an air bag deployment door formed according to the present invention.
Figure 2:
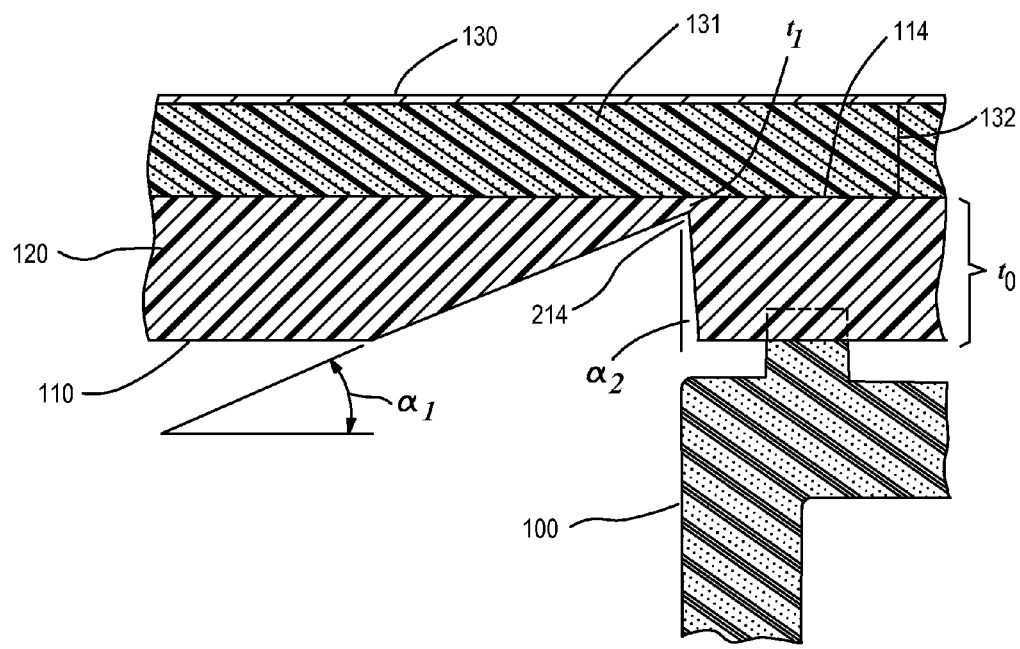
FIG. 2 is a cross-sectional view taken along section line 2-2 in FIG. 1.

The cover panel 100, shown in FIG. 1, is a portion of a larger structure such as a passenger side instrument panel, as viewed from its underside. However, it equally represents a driver side knee bolster panel, a steering wheel hub cover, or any other interior panel of an automotive vehicle through which an air bag can be deployed. Cover panel 100 is formed of a relatively rigid base structure 120 such as plastic or other material that provides the desired strength and rigidity for the panel. In the preferred embodiment, a thermoplastic substrate having a thickness $t_0$ of approximately 4 mm is utilized. The thickness $t_0$ of the base substrate structure 120 surrounding the defined door 110 is substantially constant. Base structure 120 has an inner surface 112 and an outer surface 114 (FIG. 2). An external skin material 130 is attached to the outer surface 114 of the base structure 120 and is typically made as a laminate, as is described below with reference to FIG. 2.

An air bag deployment door 110 is defined by a hinge 210, side tear seams 212a and 212b and initial tear seam 214. Hinge 210, and the tear seams 212a, 212b and 214 are formed in the lower surface 112 of the base structure 120. In this invention, the hinge and tear seams are formed during the substrate molding process to define the deployment door. Several section lines 2-2, 3-3 and 4-4 are shown in FIG. 1 to provide a basis for FIGS. 2, 3, 3 and 4, respectively.

In FIG. 2, the cross-section illustrates the initial rupturable tear seam 214 as molded into the base substrate 120. The rear seam is formed in the base substrate 120 during the substrate molding process by use of a mold preform in the having a protrusion provided with a height and in the shape of the preferred cross-section of the initial rupturable tear seam 214. In this illustration, the thickness $t_1$ of the base substrate above the initial rupturable tear seam 214 is approximately 0.25 mm or, in this case within the range on approximately 5%-10% of thickness to $t_0$ ensure that it will be weak enough to fracture and rupture when the underlying air bag is deployed from its storage container and chute 100. The deployment door 110 as defined by the hinge 210 and the tear seams is shown on the left side of FIG. 2. The molded angle of approach $\alpha_1$ for tear seam 214 is formed to be approximately 21° to provide a tapered thinness to the seam and extend the weakened area towards the door and away from the surrounding substrate 120. Outer edge angle $\alpha_2$ is approximately 1° from the vertical in order to facilitate withdrawal of the mold preform containing the protrusion for initial rupturable tear seam 214. Pre-weakened fabric seam 132 in external skin material 130 is outwardly offset from the deployment door tear seam so as to be supported by the base substrate 120 during normal use prior to deployment of the air bag. This location resists inward pressures that may cause premature fracturing of the tear seam 214.

Figure 3:
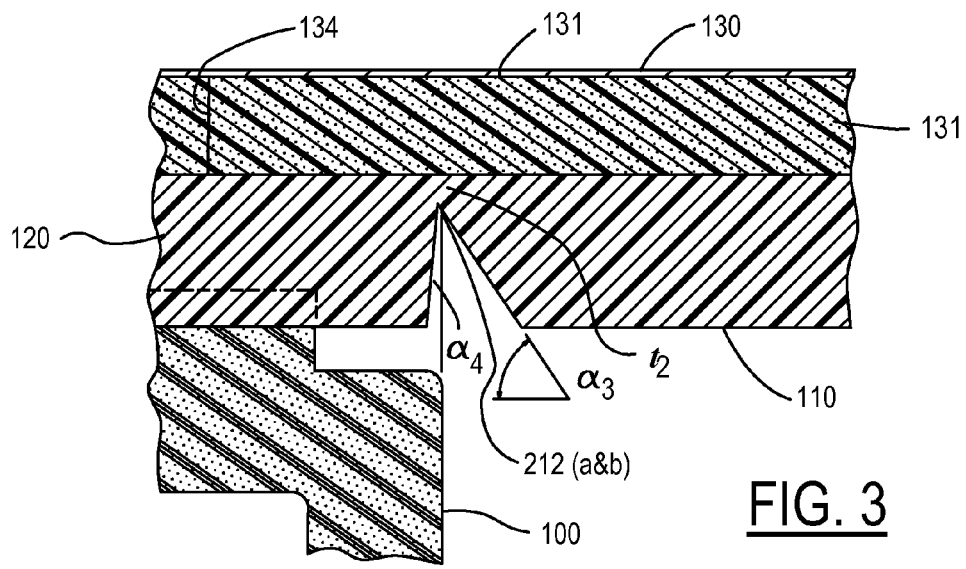
FIG. 3 is a cross-sectional view taken along section line 3-3 in FIG. 1.

FIG. 3 is a cross-sectional view taken along section lines 3-3 in FIG. 1 and illustrates a side tear seam 212. In this case, the side tear seam 212 is molded into the base substrate 120 so that the thickness $t_2$ between the protrusion from the lower mold preform and the upper mold preform is approximately twice the thickness $t_1$ of initial rupturable tear seam 214. Here, the angle of approach $\alpha_3$ is much steeper than $\alpha_1$—approximately 60°—to provide less area to be weakened along the tear seam 212. Outer edge angle $\alpha_4$ is approximately 1° from the vertical in order to facilitate withdrawal of the mold preform containing the protrusion for the side tear seam 212. As in FIG. 2, the angle of approach is towards the defined deployment door 110, rather than the surrounding base substrate 120. Pre-weakened fabric seam 134 is formed in external skin material 130 and is outwardly offset from the side tear seams 212 so as to be supported by the base substrate 120 during normal use and prior to deployment of the air bag.

Pre-weakened fabric seams 132 and 134 may be created by several methods. In the preferred embodiment of the present invention, a mechanical weakening technique is used to satisfy the invisible seam requirement. Seams 132 and 134 are formed as a series of very small holes created in external skin material 130 in a pattern that generally corresponds to the tear seams of the deployment door while being offset outwardly from the tear seams. Holes are created by use of a highly focused laser beam tuned to provide substantially invisible holes that penetrate the skin material 130 sufficiently to allow tearing when the deployment door is being forced open due to air bag deployment. Such mechanical creation of seams 32 and 134 can be performed externally after the external skin material 130 is applied to the base substrate 120 or internally prior to applying the external skin material 130 to the base substrate 120.

External skin material 130 may be of any conventional or non-conventional material, provided it can be pre-weakened in the fashion described herein to result in an invisible tear seam. For instance, a woven multilayered fabric, with a foam layer, leather, or foam underlayment and a hand-wrapped vinyl skin could be suitable.

Figure 4:
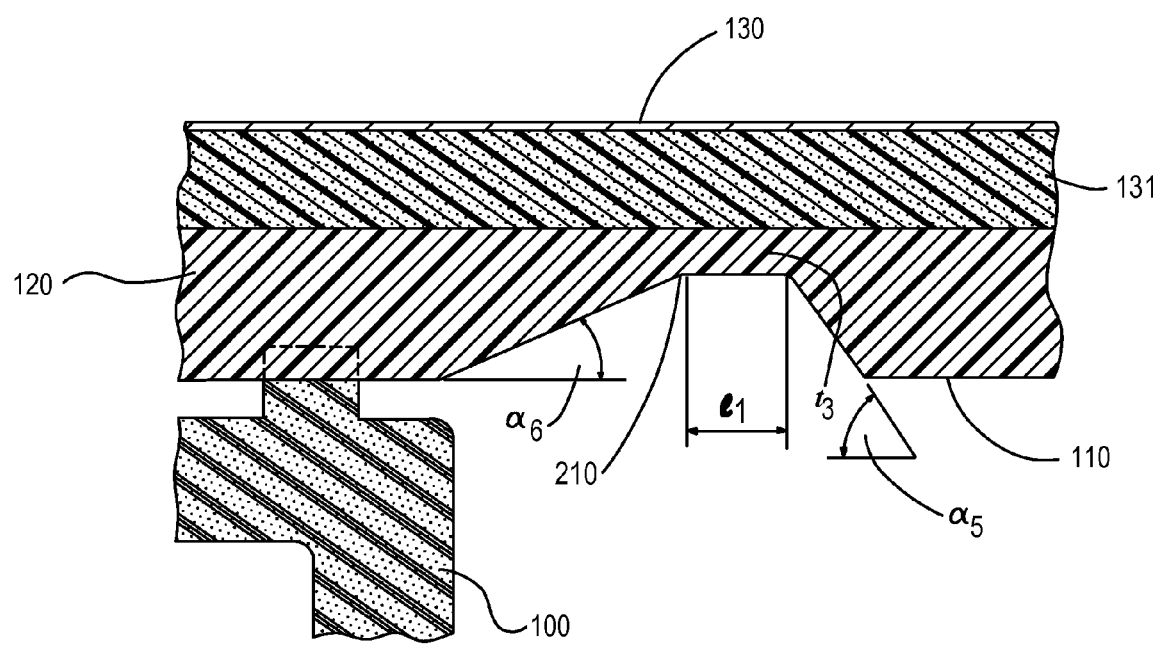
FIG. 4 is a cross-sectional view taken along section line 4-4 in FIG. 1.

In FIG. 4, a cross-sectional view of pre-weakened hinge 210 is shown which has a much wider dimension than the tear seams and has an upper thickness $t_3$ that is approximately twice the that of $t_2$. When combined with a relatively high approach angle $\alpha_5$ of approximately 60°, an outer edge angle $\alpha_6$ of approximately 21° and a width $l_1$ that is approximately 2 mm at the hinge apex, this portion will result in a tethered hinge. That is, the base substrate 102 will bend at the apex area of 210 and will not fracture and separate during deployment of the air bag.

Figure 5:
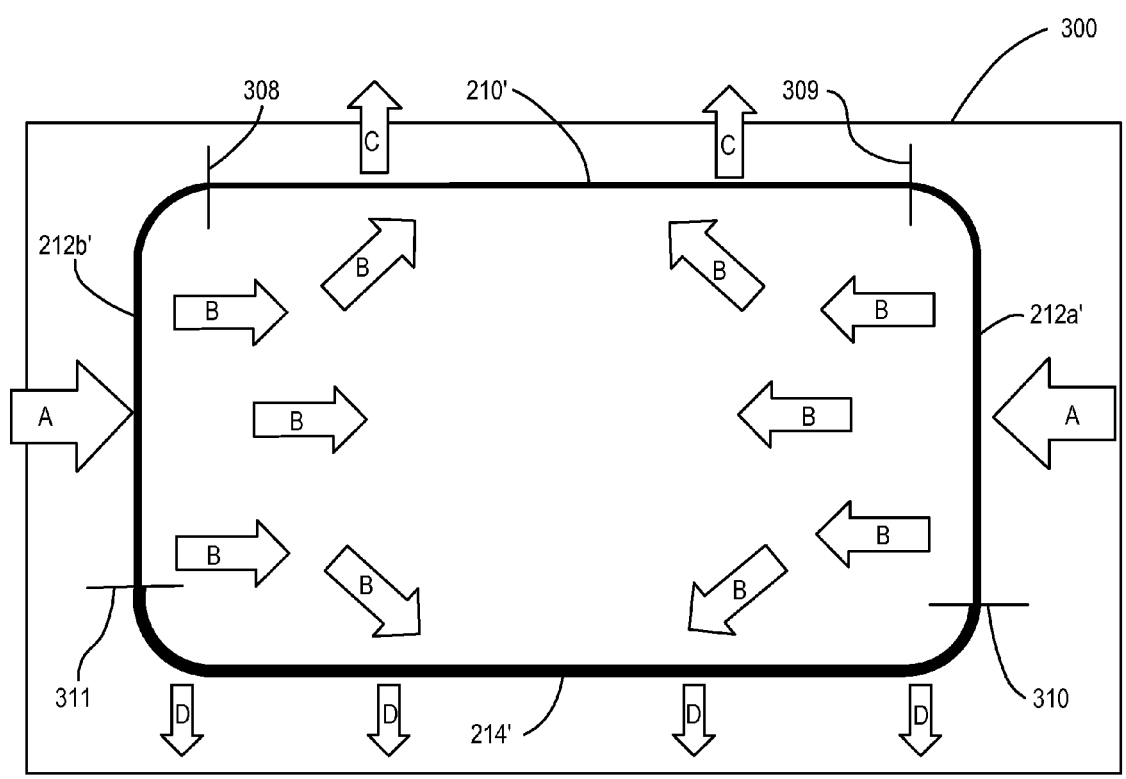
FIG. 5 is a representation of liquid phase flow into a mold utilizing components of the present invention.

In FIG. 5, a representation is made of the preferred flow of liquid substrate material into a mold that comprises upper and lower mold preforms. The representation shows the lower mold preform 300 having a hinge projection 210' that extends linearly between its ends 308 and 308. The lower mold preform also has a pair of projections 212a' and 212b' that extend between their respective ends 308 and 311 and 309 and 310. In addition, lower mold preform has with a projection 214' that extends between its ends 310 and 311. The projections correspond to the similarly non-prime numbered hinge and seams discussed above. Although not shown, it is understood that an upper mole preform of a relatively smooth surface is used to define the upper surface of the door 110 during the substrate molding process and is positions in opposition across a defined space equal to the thickness of the base substrate 120.

It has been found that a superior mold is achieved when the liquid is forced at "A" into the deployment door mold area from opposite sides across the gates formed by projections 212a' and 212b'. (Although the drawing shows flow direction at arrow A, it is understood that the flow over projections 212a' and 21b' is not confined to the arrow area, but rather is spread across the entire width of the projections.) Since the height of projections 212a' and 212b' are less than the height of projection 214' and higher than projection 210', there is an imbalance in resistance when the flow "B" enters into the door area. This imbalance allows greater flow to pass out of the door area at "C" and a lesser flow "D" to pass projection 214'. As a result, if the imbalance of flow at the gates of varying heights, there tends to be a balance of heat dissipating energy present at the gates which allows for more even curing and resultant quality in the molded product. A more even curing results in no or insignificant dimpling on the top surface of the hinge and seams that in turn allows the hinge and seams to be invisible.

As can be seen by the drawings and accompanying explanation, the present invention is a unique improvement over conventional air bag cover panels. And while the embodiment shown here is the preferred embodiment, it shall not be considered to be a restriction on the scope of the claims set forth below.

We claim:

1. An instrument panel for an automotive vehicle that contains a defined air bag deployment door, comprising:
   a relatively rigid base substrate structure having an outer surface and an inner surface, wherein said substrate is formed to have a generally constant thickness between said inner and outer surfaces in the area surrounding the defined deployment door;
   an outer finish skin material being attached to and overlying said outer surface;
   said base structure being molded to define said inner and outer surfaces and a deployment door section; and said deployment door section being defined in said molded structure by reduced thicknesses in tear seams and hinge portions formed into said inner surface and maintaining said defined deployment door invisible from the outer surface, wherein said hinge portion of said deployment door is defined by a first predetermined apex thickness that is less than said general substrate thickness in the area surrounding the defined deployment door and said hinge will bend at the apex area and will not fracture and separate during deployment of the air bag, wherein said tear seams are defined by predetermined thicknesses that are less than said first apex thickness of said hinge portion, and wherein said tear seams include a first rupturable tear seam located opposite said hinge portion and having a lesser thickness as compared to the thicknesses of said hinge and other tear seams to cause said first tear seam to fracture and rupture prior to said other tear seams during deployment of said air bag.

2. An instrument panel as in claim 1, wherein said other tear seams include a pair of side tear seams that each extend between said hinge portion and said first rupturable tear seam to define a first dimension of said deployment door.

3. An instrument panel as in claim 2, wherein said first rupturable tear seam is generally parallel and separated from said hinge portion by said side tear seams to define a second dimension of said deployment door.

4. An instrument panel as in claim 3, wherein said side tear seams are formed to have thicknesses that are intermediate the thickness of said hinge and the thickness of said first rupturable tear seam sufficient to allow separation of the sides of the deployment door from the surrounding substrate immediately after said first tear seam fractures and ruptures during deployment of said air bag.

5. An instrument panel as in claim 4, wherein said outer finish skin material is mechanically weakened in a pattern that generally corresponds to the tear seams of said deployment door while being off-set outwardly from said tear seams.

6. An instrument panel as in claim 5, wherein outer finish skin material is mechanically weakened by a series of holes formed in said skin material sufficiently small to be invisible.

7. An instrument panel as in claim 6, wherein said thickness of said first rupturable tear seam is approximately half the thickness of said second tear seams.

8. An instrument panel as in claim 7, wherein said thickness of said second tear seams are approximately half the thickness of said hinge.

9. An instrument panel as in claim 7, wherein said thickness of said first rupturable tear seam is approximately within the range of from 5%-10% of the thickness of the substrate adjacent thereto.

10. A method of forming an invisible door in an instrument panel of an automotive vehicle for allowing the deployment of an air bag, comprising the steps of:
providing a mold for an instrument panel substrate with a plurality of mold preforms placed in a spaced apart configuration for forming said substrate with upper and lower surfaces in an area that will define said deployment door of a first predetermined thickness;
providing one of said plurality of mold preforms for forming said lower substrate surface at least in the area that will define said deployment door;
providing one of said plurality of mold preforms opposing said lower surface mold preform for forming said upper surface at least in the area that will define said deployment door;
providing said lower surface mold preform with a plurality of protrusions entering said space between said mold preforms to define at least one hinge seam and a plurality of tear seam indentations in said lower surface;
providing said upper surface mold perform to form a non-indented and smooth substrate surface at least in those opposing areas where said protrusions enter said space between said mold performs;
providing said protrusion for said at least one hinge seam at a predetermined first height extending into said space between said mold preforms;
providing said protrusions for said tear seams at predetermined heights that are greater than said first height;
providing a protrusion for one of said tear seams running substantially parallel to said at least one hinge seam protrusion at a second predetermined height that is greater than all other protrusion heights;
flowing a liquid phase of said substrate material between said mold preforms; and
allowing substrate material between said mold preforms to set to a self-supporting solid before removing said instrument panel from said mold preforms.

11. A method as in claim 10, further including the step of providing a pair of generally parallel side protrusions for a pair of side tear seams that extend from said hinge seam to said one tear seam, each at a predetermined height that is intermediate said first and second predetermined heights.

12. A method as in claim 11, wherein said step of flowing includes the step of forcing said liquid phase of said substrate material from opposite sides, over said opposing protrusions, into the area defining said deployment door, and causing said liquid phase material to fill said space and be gate controlled by said protrusions in its flow over said first and second protrusions as said liquid flows outward from said area defining said deployment door.

13. A method as in claim 11, wherein said step of providing said protrusion for said one of said tear seams includes the step of providing said protrusion with a second predetermined height that is greater than all other heights is performed to allow formation of a first rupturable tear seam of said deployment door.

14. A method as in claim 13, wherein said step of providing a pair of side protrusions includes the step of providing said protrusions at a height to allow formation of a pair of side tear seams that are approximately twice the thickness of said first rupturable tear seam of said deployment door.

15. A method as in claim 14, wherein said thickness of said first rupturable tear seam is formed to be approximately within the range of from 5%-10% of the thickness of the substrate adjacent thereto.

16. A method as in claim 14, wherein said first rupturable tear seam is formed to be located generally parallel to said hinge portion and to have the lesser of said at least one hinge seam and said side tear seam thicknesses to allow said first rupturable tear seam to rupture first during deployment of said air bag.

* * * * *